United States Patent [19]

Rieck

[11] Patent Number: 4,955,142
[45] Date of Patent: Sep. 11, 1990

[54] DECK SPACING TOOL

[76] Inventor: Kenneth J. Rieck, 7 Olde Orchard Ln., Fairport, N.Y. 14450

[21] Appl. No.: 403,476

[22] Filed: Sep. 6, 1989

[51] Int. Cl.$^5$ .......................... G01B 3/30; G01B 3/32
[52] U.S. Cl. ........................................ 33/526; 33/645; 33/613
[58] Field of Search ................. 33/526, 645, 613, 518, 33/527, DIG. 20

[56] References Cited

U.S. PATENT DOCUMENTS

| 89,281 | 4/1869 | Boroner | 33/613 |
|---|---|---|---|
| 1,549,671 | 8/1925 | Kridleer et al. | 33/613 |
| 1,742,103 | 12/1929 | Sholtes . | |
| 2,466,919 | 4/1949 | Sykes . | |
| 2,744,334 | 5/1956 | Jonoale | 33/613 |
| 2,797,495 | 7/1957 | Walston | 33/518 |
| 2,930,135 | 3/1960 | Rodtz, Sr. . | |
| 3,031,669 | 5/1962 | Lawson | 33/613 |
| 3,104,473 | 9/1963 | Rose | 33/613 |
| 3,174,227 | 3/1965 | House . | |
| 3,290,712 | 12/1966 | Richey . | |
| 3,735,497 | 5/1973 | Boettcher | 33/526 |
| 4,420,921 | 12/1983 | Haroin | 33/613 |
| 4,625,415 | 12/1986 | Diamontis | 33/613 |
| 4,686,769 | 8/1987 | Rock et al. | 33/613 |
| 4,850,114 | 7/1989 | Vockins | 33/645 |

Primary Examiner—Thomas B. Will
Attorney, Agent, or Firm—Marjama & Pincelli

[57] ABSTRACT

A hand tool for use in placing deck boards on a support structure which is in the form of a unitized main body portion which comprises at least one substantially vertically extending blade having an outer exposed edge, the blade being suitable for placement between adjacent deck boards so as to maintain a uniform space prior to permanently fixing the deck boards in place, a pair of substantially generally horizontally extending stabilizing arms extending from and integral with opposite sides of the base of the blade.

11 Claims, 4 Drawing Sheets

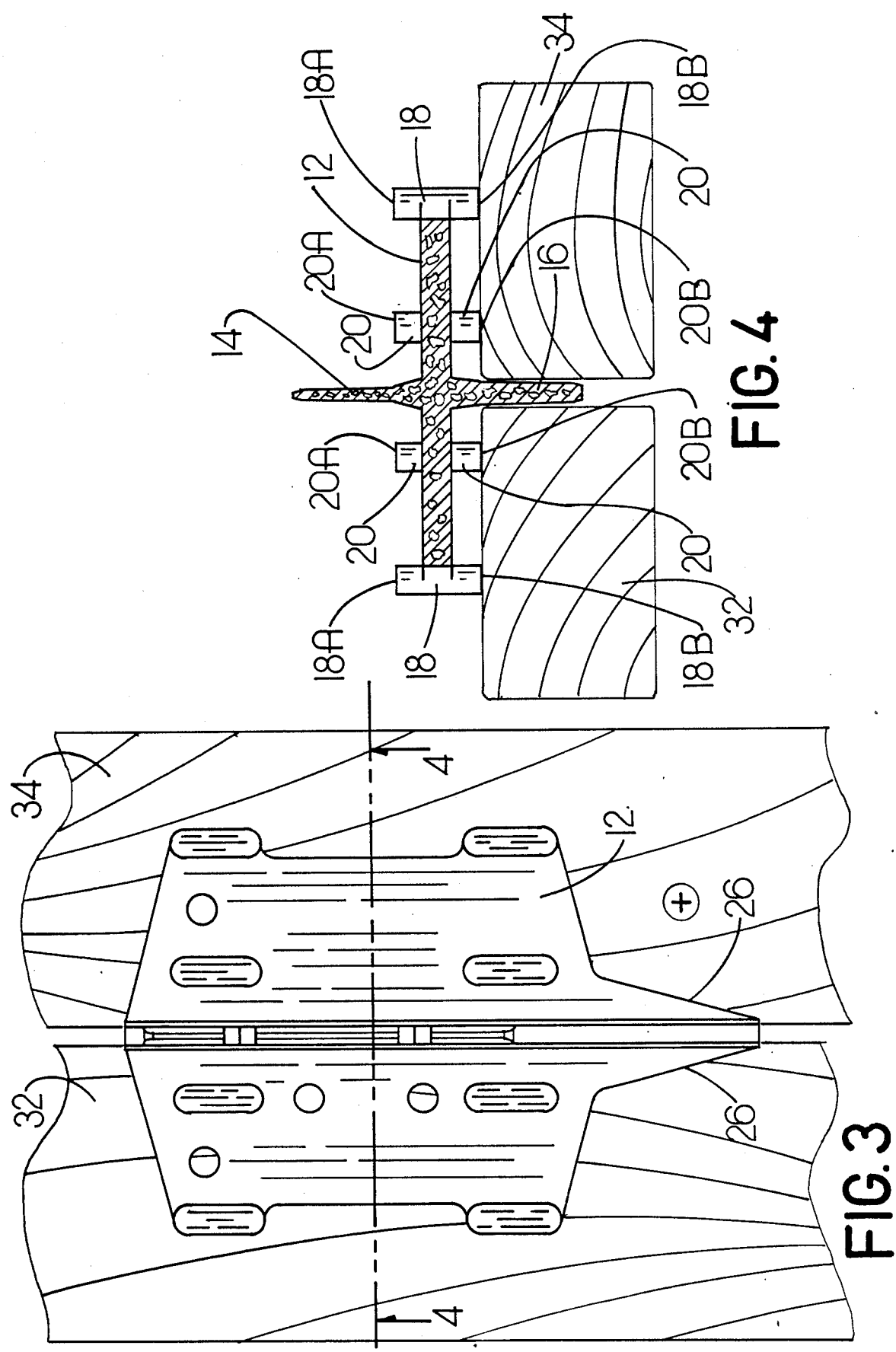

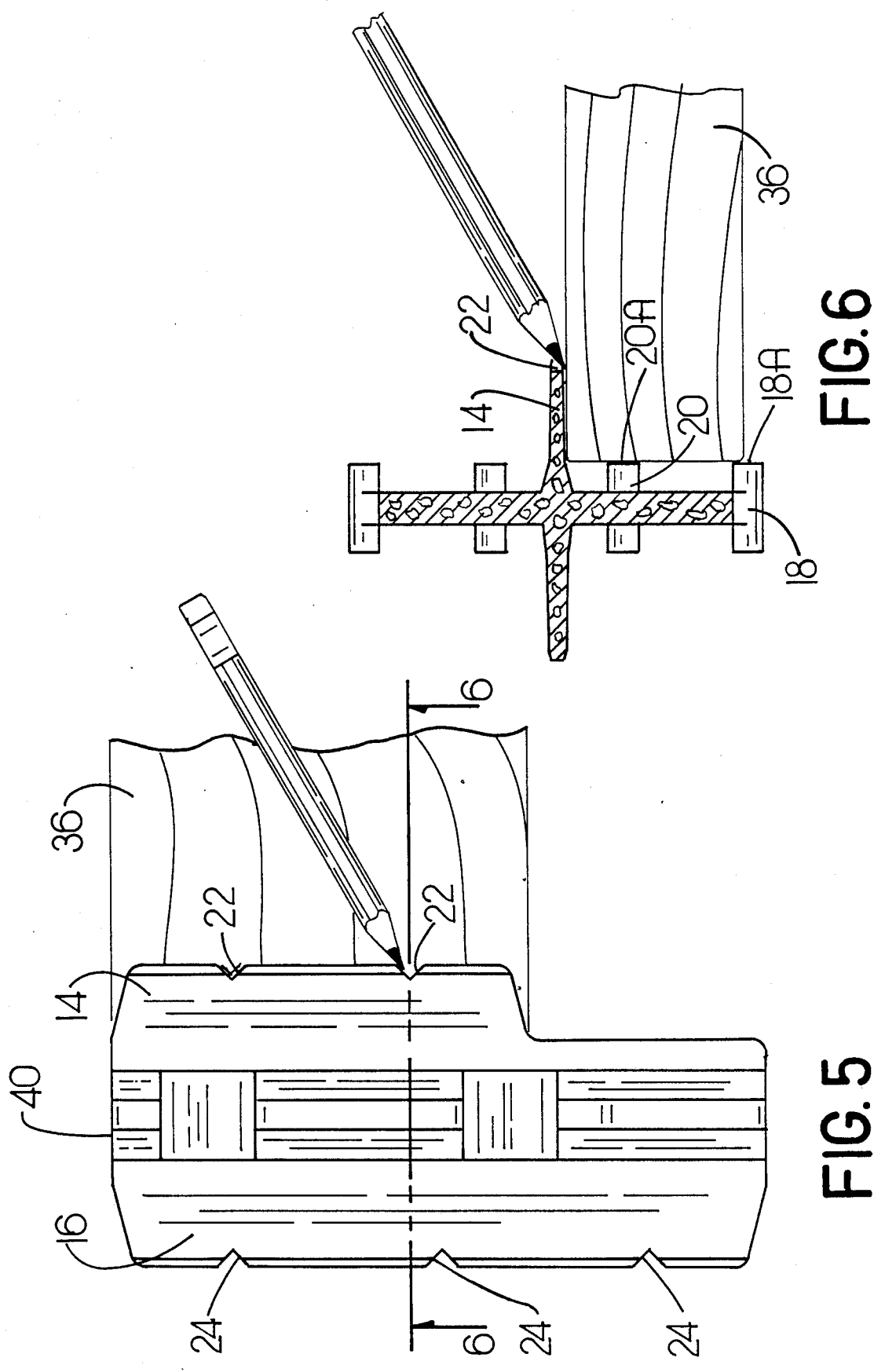

4,955,142

DECK SPACING TOOL

BACKGROUND OF THE INVENTION

The present invention relates in general to a tool for use in the construction of decks, platforms, docks, outdoor structures and the like, and more specifically, a tool for spacing the top surface deck boards.

In constructing a deck, which is usually made of wooden boards, it is desirable that a uniform space, whatever it may be, be maintained between adjacent deck boards in order to allow surface water or rain to pass through the deck and also to aid in ventilation.

Currently, it is customary in building decks, and also suggested in construction and do-it-yourself books on the market today, to maintain an equal space between deck boards. The prior art suggests the use of handmade wooden spacers or the use of other devices such as nails of a certain size. Although this technique to some extent is useful and does work, it is cumbersome and unreliable and usually causes frustration to the user. Wooden spacers have a tendency to become wedged between the deck boards and become difficult and time consuming to remove. Both wooden spacers and nails also have a tendency to fall through the cracks while maneuvering the boards into place.

There is, therefore, an apparent need in constructing decks for a simple, reliable tool which will provide for even and uniform spacing between adjacent deck boards, and which will not fall between or easily become wedged between the boards, and which may be reused indefinitely.

It is therefore an object of the present invention to provide a deck spacing tool which overcomes the disadvantages of the prior art noted above.

SUMMARY OF THE INVENTION

The present invention is directed to a unitary deck spacing tool which is used as an aid for spacing the top surface of adjacent deck boards. The tool is characterized by a main body portion which comprises a pair of substantially generally horizontally extending stabilizing arms and at least one substantially vertically extending spacing blade attached to and between said stabilizing arms. The spacing blade is placed between adjacent deck boards so as to maintain a uniform space prior to permanently nailing or screwing the deck boards in place. The tool may optionally contain a template means at the bottom or free edge of the spacing blade to facilitate marking the deck boards for holes to be drilled near the ends of the boards when using screws, or to indicate the location of nails for carrying out the same purpose. In a preferred embodiment, the main body portion comprises two vertically extending spacing blades on either side of the stabilizing arms, each of which has a different predetermined thickness to provide an optional spacing width to the user.

BRIEF DESCRIPTION OF THE DRAWINGS

FIG. 3 is a top elevational view of the device of FIG. 1 in use for spacing two deck boards;

FIG. 4 is a sectional view through lines 4—4 of FIG. 3;

FIG. 5 is a side elevational view of the device of FIG. 1 when used at the end of a board to position screw or nail holes.

FIG. 6 is a sectional view through lines 6—6 of FIG. 5; and

DETAILED DESCRIPTION OF THE INVENTION

Figure 1:
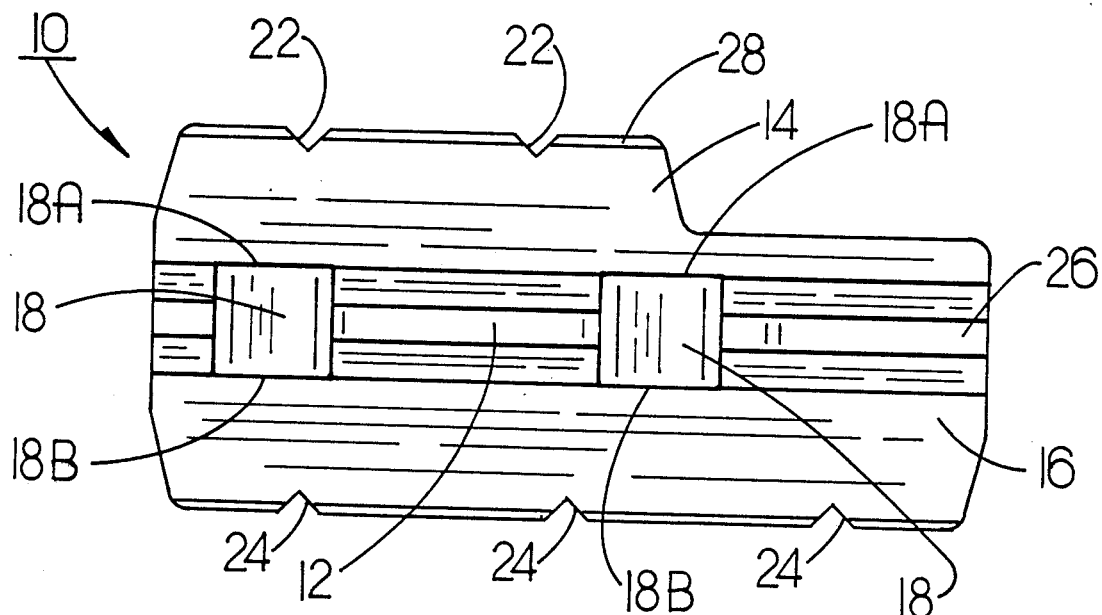
FIG. 1 is a side elevational view of the device of the present invention.

The deck spacing tool of the present invention is illustrated in FIG. 1 by reference character 10. The tool may be made of any suitable material such as plastic, metal, wood, graphite, etc. Preferably the tool is made of any suitable durable plastic. The tool 10 in a preferred embodiment comprises a unitary structure which is made by injection molding a suitable plastic material such as acrylonitrile-butadiene-styrene (ABS), or ABS structural foam, or polystyrene structural foam. Preferably it is desired that the material be able to float on water, and in this embodiment would comprise the addition of a foaming agent to the plastic material to enable flotation.

Figure 2:
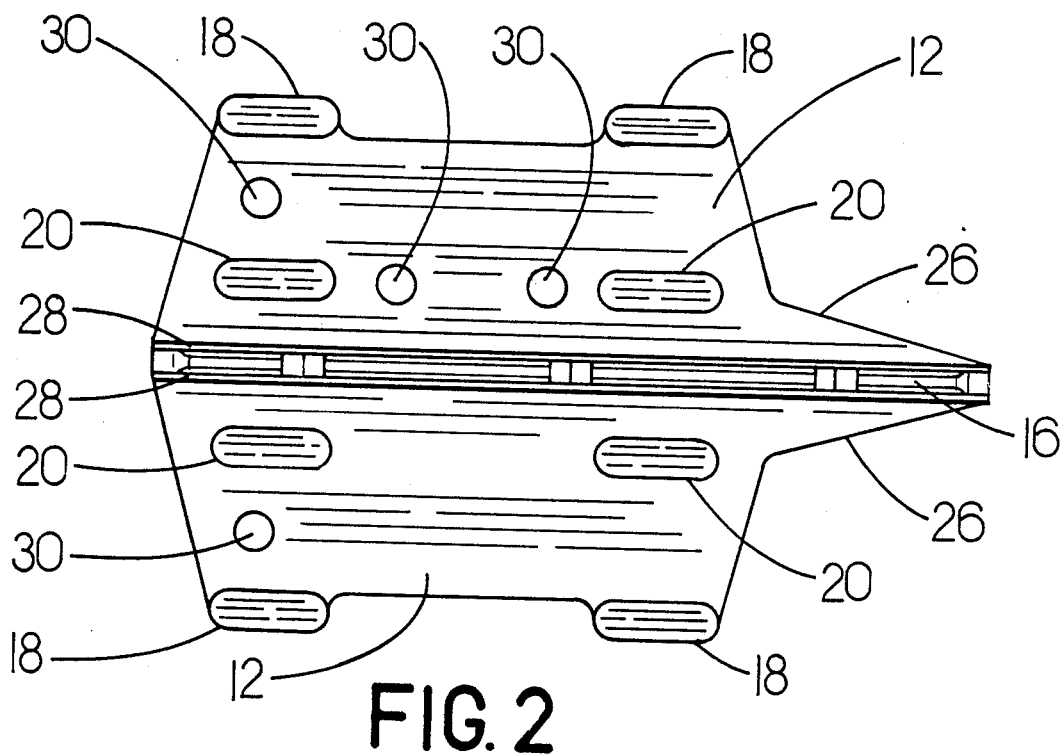
FIG. 2 is a bottom elevational view of the device of FIG. 1.

The tool comprises a pair of substantially flat horizontally extending stabilizing arms 12 as illustrated in FIGS. 1 and 2. Formed integral with arms 12 are vertically extending dual spacing blades 14 and 16, respectively, each having a different thickness in order to allow for varying spacing between deck boards as desired by the user. The unitary structure formed by the stabilizing arms and the spacing blades may be referred to as the main body portion. Typically, one blade would have a thickness of ⅛ inches and the other blade, a thickness of 3/16 inches. In order to facilitate insertion between adjacent deck boards, the exposed edges of both spacing blades are beveled as shown by 28. The spacing blade further contains at its bottom or exposed edge, template means 22 and 24 respectively, which are illustrated in the drawings as notches, and function to position adjacent nail or screw locations at the ends of the deck boards as will be hereinafter described in greater detail.

Figure 7:
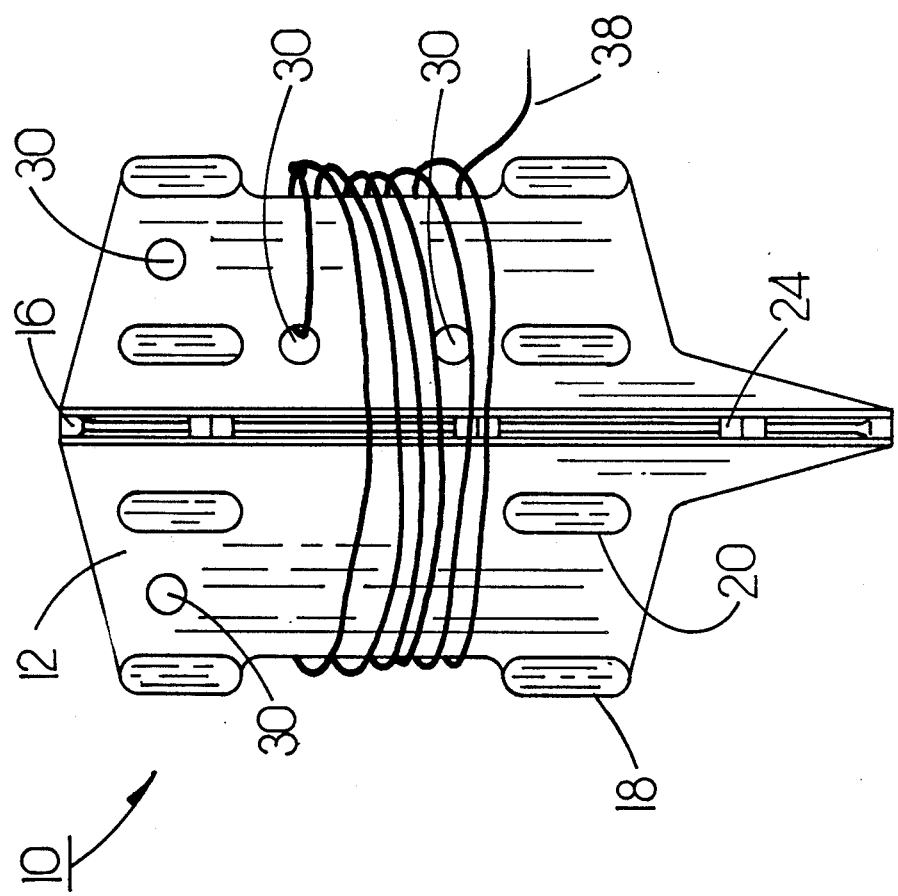
FIG. 7 is a bottom elevational view of the device of FIG. 1 which illustrates the placement of tethering means through a hole in the main body portion.

The stabilizing arms further contain a plurality of external and internal spacer stabilizing tabs 18 and 20 respectively, which further contain contact surfaces 18A, 18B, and 20A, 20B respectively, for spacing the main body portion of the deck tool above the deck boards as illustrated in FIG. 4, and also for proper positioning and stabilizing the template means at the end of the boards as illustrated in FIG. 6. The tool further contains the cut out portions 26 adjacent one end of the main body portion to allow access of the device to adjacent nail or screw locations when in use. The device optionally contains one or more holes 30 for tethering the device to a piece of twine or string 38 in order to secure the device to another object, or the user for purposes of retrieval (FIG. 7).

The use of the device for spacing boards is more clearly illustrated in FIGS. 3 and 4. In FIG. 3 the device is illustrated as maintaining an equal spacing between two adjacent deck boards 32 and 34 with vertically extending blade 16 separating said boards to the desired width. In this mode, the body portion of the tool is supported above the deck surface by stabilizing spacer members 18 and 20 on contact surfaces 18B and 20B respectively, as more clearly shown in the sectional view in FIG. 4. In an optional preferred embodiment, the vertically extending spacer blades are slightly tapered to the desired angle, such as about 1°–5° to facilitate ease of removal from adjacent deck boards once the boards are fixed in place.

In a further embodiment, as illustrated in FIG. 5 or 6, template means 22 as shown in FIG. 5 are positioned at the end of board 36 to properly position nail or screw holes with a pencil. In using the template, flat end portion 40 is placed parallel with the side of board 36 to properly position the template notches 22. As illustrated in FIG. 6, stabilizing spacer means 18 and 20 aid in stabilizing and positioning said template means in use by maintaining a proper distance and providing stability with surfaces 18B and 20B providing contact against the end of board 36.

It should be understood that the length of blades 14 and 16, with associated template means 22 and 24, respectively, can be made to accommodate any width of deck board. As illustrated, blade 14 has been sized for 2×4's and blade 16 for 2×6's.

It can be seen that the deck spacing tool of the present invention provides an effective method for accurately spacing adjacent deck boards, and additionally to uniformly position nail and screw holes at the end of deck boards. The unitized device is reliable and inexpensive, and aids in efficiently constructing a deck having adjacent boards of uniform spacing.

Although particular embodiments of the present invention have been disclosed herein for purposes of explanation, it should be understood that further modifications or variations thereof, will be apparent to those skilled in the art to which this invention pertains.

I claim:

1. A hand tool for use in placing deck boards on a support structure, said tool being in the form of a unitized main body portion which comprises a pair of oppositely extending vertical blades suitable for placement between adjacent deck boards so as to maintain a uniform space prior to permanently fixing said deck boards in place, said blades being integrally connected to the main body portion at a base section, a pair of substantially flat generally horizontally extending stabilizing arms, integral with and extending from opposite sides of the base of said blades, each stabilizing arm having at least one spacing member on each of its flat surfaces for placement on the top surface of the deck boards so as to provide means to facilitate removal of said hand tool and assure vertical orientation of the blade between adjacent boards.

2. A hand tool according to claim 1 wherein at least one of said blades has an exposed bottom edge opposite said base section which contains template means for providing proper positioning and location of nail or screw holes.

3. A hand tool according to claim 1 wherein said stabilizing arms include a cut-out portion adjacent one end of the main body to allow access to an adjacent nail or screw location.

4. The hand tool of claim 3 wherein the cut-out portion forms a tapered end section.

5. The tool of claim 1 which is made essentially of a durable plastic.

6. The tool of claim 1 in which the plastic contains a foaming agent to render it flotational.

7. The hand tool of claim 1 wherein the bottom edge of at least one of said blades is beveled.

8. The hand tool of claim 1 wherein the main body portion contains at least one hole for tethering while in use.

9. The hand tool of claim 1 in which one blade has a thickness of about ⅛ inches and the other blade has a thickness of about 3/16 inches.

10. The hand tool of claim 1 in which the side walls of the blade have a taper in the range of about 1–5 degrees to facilitate ease of removal from adjacent boards.

11. The hand tool of claim 1 in which the pair of blades are positioned in substantially the same vertical plane.

* * * * *